United States Patent [19]

Worthington et al.

[11] Patent Number: 4,902,097
[45] Date of Patent: Feb. 20, 1990

[54] OPTICAL FIBRE CABLES

[75] Inventors: Peter Worthington, Marchwood; John N. Russell, Ringwood, both of Great Britain

[73] Assignee: STC PLC, London, England

[21] Appl. No.: 62,727

[22] Filed: Jun. 15, 1987

[30] Foreign Application Priority Data

Jun. 17, 1986 [GB] United Kingdom ............... 8614671

[51] Int. Cl.⁴ .............................................. G02B 6/44
[52] U.S. Cl. ..................................................... 350/96.23
[58] Field of Search ...................................... 350/96.23

[56] References Cited

U.S. PATENT DOCUMENTS

| | | | |
|---|---|---|---|
| 4,448,484 | 5/1984 | Lombardi et al. | 350/96.23 |
| 4,472,021 | 9/1984 | Ansel et al. | 350/96.23 |
| 4,484,963 | 11/1984 | Anctil et al. | 350/96.23 X |
| 4,600,268 | 7/1986 | Spicer | 350/96.23 |
| 4,606,604 | 8/1986 | Soodak | 350/96.23 |
| 4,715,676 | 12/1987 | Sutehall et al. | 350/96.23 |

FOREIGN PATENT DOCUMENTS 2115172 9/1983 United Kingdom ............ 350/96.23

Primary Examiner—John D. Lee
Attorney, Agent, or Firm—Lee & Smith

[57] ABSTRACT

A method of making very long length e.g. 50 km of optical fibre submarine cable in which acrylate-coated fibres (5) are guided by a fixed lay plate (10) and embedded by a fixed trumpet shaped die (7) in a relatively soft thermoplastic polymer coating (3) (e.g. Hytrel-RTM) with a zero lay angle. The coating (3) is heat softened and carried on a kingwire (2). The partially-embedded fibres are encased in a second coating (12) of the polymer by conventional extrusion. The element is coated with a water blocking material as the element is encased in a tubular strength member comprising a conductive tube of copper or aluminium surrounded by two layers (24,25) of high tensile strength wires. A dielectric sheath of e.g. natural polyethelene is extruded over the wires. The structure of the cable limits the bending of the fibres to e.g. 0.6 m, so that very low losses can be achieved.

8 Claims, 3 Drawing Sheets

OPTICAL FIBRE CABLES

This invention relates to optical fibre cables, particularly but not exclusively such cables suitable for long distance underwater transmission systems.

BACKGROUND OF THE INVENTION

We currently manufacture a cable similar to the one described and claimed in British Patent Application No. 8229562 (C.S. Parfree et al 20) (Serial No. 2128358). The optical fibre package comprises a plurality of secondary coated optical fibres e.g. coated with Nylon 12 (RTM) over a primary Sylguard (RTM) coating which are helically laid up around a kingwire and held in a package by a whipping. This has proved satisfactory, but with the advent of acrylate coated fibres i.e. fibres with one or more layers of acrylic coating over the bare fibre, which are now in widescale production, attempts to substitute these fibres for the Nylon coated fibres failed because the transmission loss was unacceptably high. This was due to the lack of buffering between the acrylate fibres and the rest of the package.

One arrangement for a cable element for use in a submarine cable is proposed in our co-pending patent application (as yet unpublished at the time of making the present application) S.R. Barnes et al 4-3-2 (British Patent Application No. 8516290) in which acrylate coated fibres are drawn through a forming die together with a central kingwire, and a thermoplastic polymer, particularly one marketed under the trade name Hytrel, is extruded around and between the fibres and kingwire in a "one-shot" operation. This encapsulates the fibres and kingwire in a straight lay configuration in one pass without any subsequent extrusion process and the element so formed can be used directly in the longitudinal cavity of a submarine cable such as the one described in Parfree 20, in place of the optical fibre package there described.

This technique is difficult to control in such a way that the original low loss of the fibres is guaranteed in the finished element and stresses are imparted to the fibres as they pass through the extrusion head which are difficult to control or quantify.

Whilst this has proved suitable for relatively short lengths e.g. up to 5 Km, the losses and the yield are still not as good as we have obtained with the previous package referred to above.

An alternative approach is disclosed in our published British Patent 2113903B (L.R. Spicer 26) in which optical fibres and a coated string are pulled through precision tooling having a bore for each fibre, whereby the optical fibres are partially embedded in the outer periphery of low-density-polyethelene-coated string which has been heat softened, and extruding an insulating sheath over the partially embedded fibres, which sheath can for example be high density polyethelene.

None of the proposals discussed above enables long lengths e.g. 50 km of cable to be produced in a continuous process. For example using the above processes we achieved only 5 kms before a fibre broke due to dust build up in the tooling. Also spliced fibres have a bulge in the coating so they would not pass through the precision tooling of e.g. 2113903B.

Another proposal is set forth in published British Patent Specification 2136350A in which a central strength member is heated and a first layer of thermoplastic elastomer is extruded onto the heated central strength member. Optical fibres are laid along a helical path onto the first layer with a planetary motion. A second layer of thermoplastic elastomer is extruded over the fibres and merges with the first layer, and then a protective nylon sheath is extruded around the elastomer. For undersea applications the central strength member may be a central conductor of a coaxial cable, for low frequency signaling of information for surveillance, maintenance and control.

However the equipment is complex requiring as it does a rotating die and rotating bobbins and lay plate equipment (FIGS. 3 and 4) requiring a completely enclosed environment for each fibre during passage from the bobbin to the die. Furthermore each fibre passes through four separate guides during its passage from the supply bobbin to the closing die.

It is an object of the present invention to overcome the above problems in a simple effective manner to provide a cable element of very long length e.g. 50 kms and above, suitable for a submarine cable and using acrylate or equivalent coated fibres.

SUMMARY OF THE INVENTION

According to the present invention there is provided an optical fibre cable including a tubular tensile strength member defining a longitudinal chamber and, within said chamber, an optical fibre cable element comprising: a plurality of optical conductors each having over the bare conductor a first protective coating which is relatively thin; a central string wire having a buffer coating into which the fibres have been embedded so that they are spaced from the central string and from each other with a zero angle of lay, and a second buffer coating enveloping the embedded fibres, said cable having a longitudinal water blocking material in the gap between the element and the longitudinal chamber.

According to another aspect of the present invention there is provided a method of making an optical fibre element in long lengths e.g. 50 km, comprising providing a string member comprising a buffer material, providing a plurality of optical fibres each having a protective coating thereon, drawing the string member and the fibres through a fixed lay plate and a tapered-aperture die spaced from the lay plate, in that order, the lay plate serving to maintain the fibres in a predetermined-spaced-apart relationship as they enter the die, causing said fibres to become at least partially embedded in the buffer material, and extruding a buffer envelope over the central string member and embedded fibres to encapsulate the fibres in the buffer envelope and buffer coating.

According to a further aspect of the present invention there is provided a method of making an optical fibre cable comprising providing or making an element as claimed in claim 1, or claim 7 respectively, inserting the element into the open channel of elongate metal member, closing the metal member around the element with a small gap, said gap being water blocked with a water blocking medium, applying strength member wires around the closed metal member, and extruding plastics jacket over the wires.

BRIEF DESCRIPTION OF THE DRAWINGS

In order that the invention can be clearly understood reference will now be made to the accompanying drawings, in which.

DESCRIPTION OF PREFERRED EMBODIMENT

Figure 1:
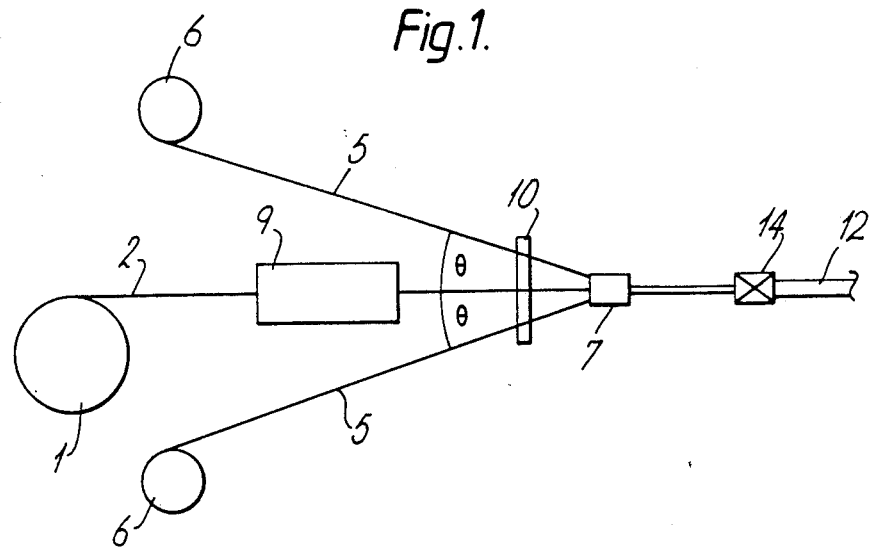
FIGS. 1 and 1A show apparatus for carrying out the method of making the cable according to an embodiment of the present invention.
Figure 2:
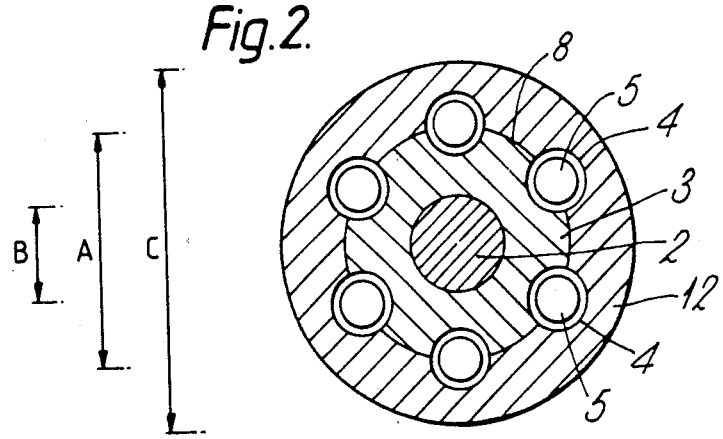
FIG. 2 shows in cross section a submarine telecommunications cable element made by the apparatus and method shown in FIG. 1.

Referring to FIG. 1 of the drawings the apparatus for making the cable element shown in FIG. 2 comprises a bobbin 1 carrying a kingwire 2 made of steel, Nylon (RTM) or Kevlar (RTM) or other high tensile material and coated with a buffer coating 3 of a thermoplastic elastomer, which is soft in comparison with the acrylate coating 4 on optical fibres 5. We prefer to use an elastomer sold under the trade name Hytrel. The acrylate coated fibres 5 are carried on bobbins such as 6.

The coated kingwire 1 and the coated fibres 5 are guided into and drawn through a die 7 which partially embeds the fibres 5 into the periphery 8 of the buffer coating 3. The coated kingwire is also passed through a heater tube 9 which heats the coating on the kingwire to a temperature of about 160° C. ±10° C. which softens the coating to a point at which the fibres become partially embedded into the coating 3 by the die.

Figure 1A:
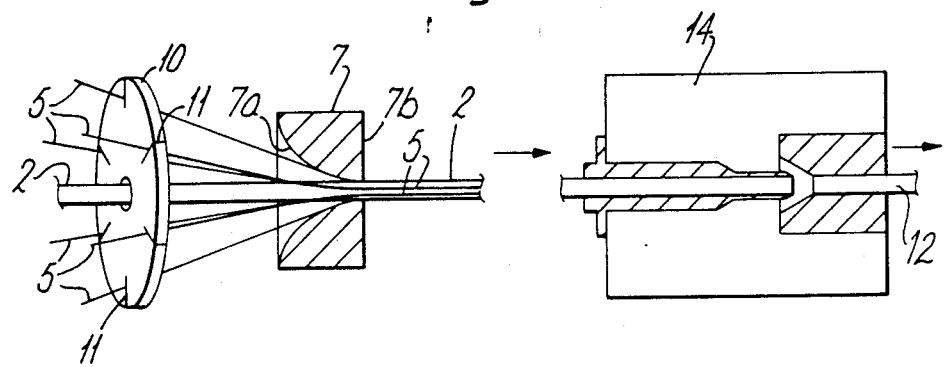

The die is shaped as shown in the FIG. 1A and has an internal diameter A' which is, at its narrowest point just short of the face 7b, 300μm larger than the diameter A of the coated kingwire 2. FIG. 1A shows a cross section of the die 7 with the fibres 5 visible and being partially embedded in the periphery of the coated kingwire 2.

The fibres 5 are guided into the die 7 by a fixed lay plate 10 which has a number (twelve) of guide slots such as 11 each several millimetres wide (holes could be used instead) in which the fibres are loosely guided in a predetermined angularly-spaced-apart relationship around the kingwire 2 as they all enter the die 7 and this equal spacing is maintained within the die 7 by the tension in the fibres and the fixed lay plate. This tension lies in the range 10 to 100 grams and the back-tension in the kingwire is carefully controlled, together with the temperature of the heater 9 to ensure that the net longitudinal compressive or tensile strain on the fibres in the straight, finished element is minimal and does not exceed 0.05%.

The radius of curvature of the surface 7a and of the walls of grooves or holes 11 are such that the curvature imposed upon the fibre restricts the strain on the outside surface of the fibre to significantly less than the proof strain. In the present embodiment the radius is about 10 mm which gives ample margin for a 1.00% proof-tested fibre requiring a minimum diameter of 6.2 mm.

Following the die 7 is a crosshead extruder 14 of completely conventional design and this extrudes a second buffer coating 12 of a soft thermoplastic polymer over the partially embedded fibres 5. The polymer is preferably the same material as was used for the first buffer coating 3, namely one sold under the trade name Hytrel.

The shore A hardness of the buffer coatings preferably lies in the range 70 to 90 at ambient temperature.

In the preferred embodiment described the coated fibres 5 have a diameter of 280 to 300 μm, the diameter A of the coated kingwire lies in the range 1.4 to 1.8 mm, the diameter C of the second buffer coating lies in the range 3.1 to 3.4 mm and the diameter B of the kingwire has in the range 0.6 to 1.0 mm, so both coatings 3 and 12 are many times thicker than the coated fibre diameter.

Figure 3:
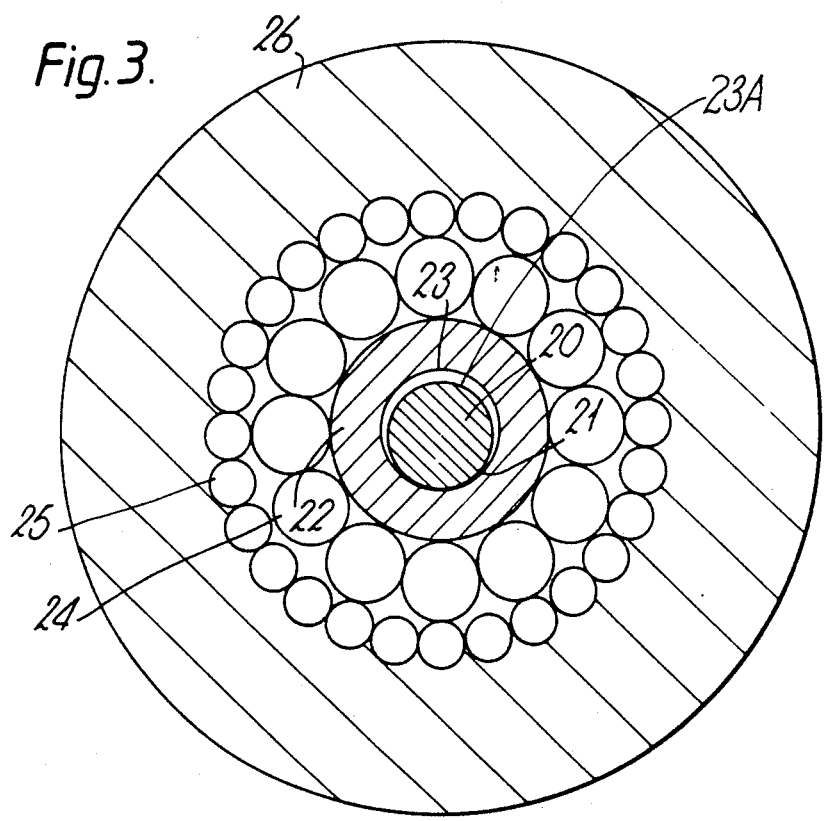
FIG. 3 shows in cross section a submarine cable embodying the element of FIG. 2 and in accordance with an embodiment of the invention.

FIG. 3 shows in cross section a deep water submarine cable incorporating the element of FIG. 2. The element is shown schematically and represented by the reference numeral 20. The element is housed in a longitudinal cavity 21 defined by a tubular metal member 22 with a small space 23 which is water blocked either continuously or intermittently along the length of the cable with a viscous water blocking material 23A such as that sold under the trade name HYVIS 2000. The metal member 22 can be of copper or aluminum and can be made by closing an extruded "C" section element. The cavity 21 has a diameter of about 0.2 to 0.6mm larger than that of the element 20, preferably 0.3 mm larger.

Around the member 22 are two layers 24 and 25 of tensile strength wires, the inner layer 24 having a few relatively thick wire and the layer 25 having over twice as many relatively thinner wires.

Around the strength member wire is extruded a dielectric material 26 such as polyethelene to insulate the metal member 22 from the water so that it can be used to carry electricity at about 7000 Volts from end to end of the system to power regenerators of the system.

Figure 4:
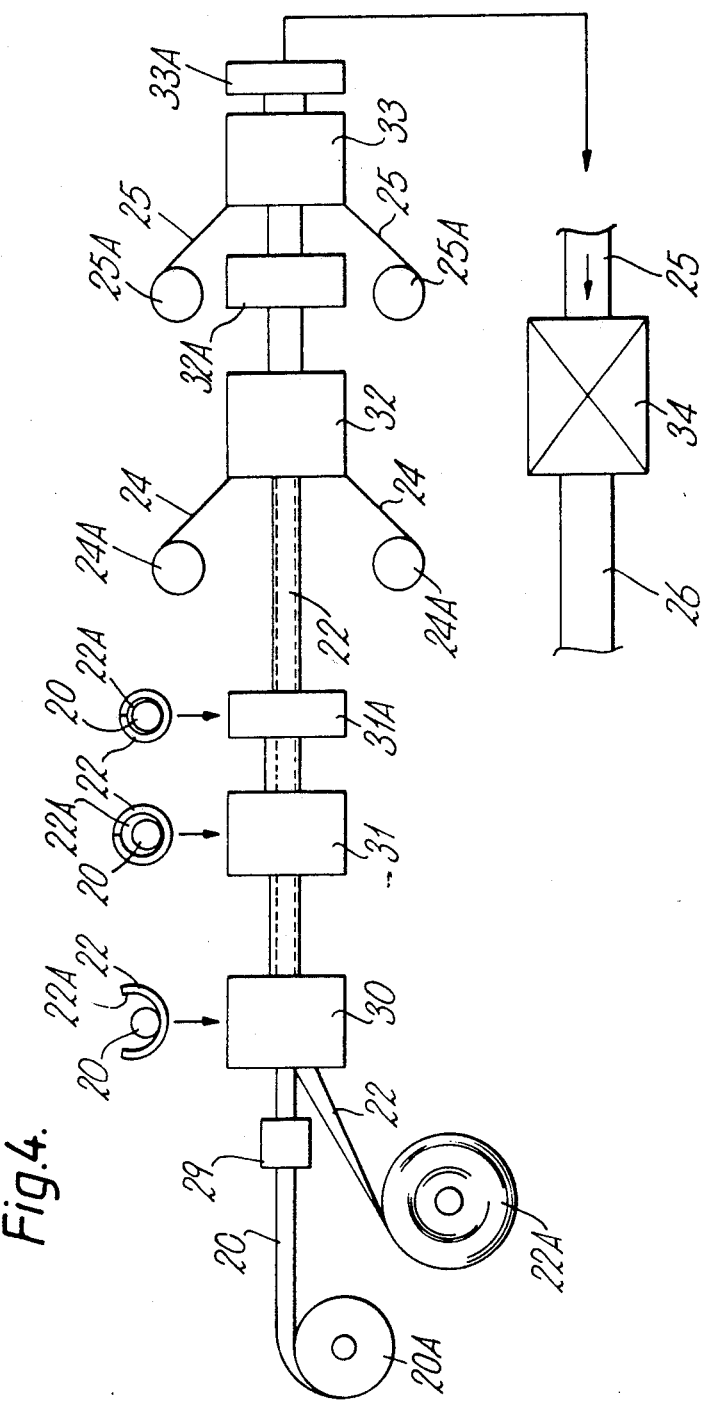
FIG. 4 shows a method of making the cable of FIG. 3.

In manufacturing the cable of FIG. 3, the processor of FIG. 4 is used. The element 20 is drawn from a reel 20A through a water blocking station 29 which smears the surface of the element 20 with a thin, e.g. 0.2 to 0.4mm thick, layer of the water blocking medium 23A. The smeared element 20 is then guided into the open channel of the metal member 22, which has a "C" shaped cross section, in a station 30. Closing station 31 then closes the "C" section member 22 and the whole passes through a forming die 31A which slightly reduces the closed metal member to a desired outer diameter and ensures the smear of water blocking medium 23A fills the gap 23.

Then the cable passes through a stranding machine having a first part 32 which applies the first layer of strength member wires 24 from reels 24A and a second part 33 which applies the second layer of strength member wires 25 from reels 25A. In between stations 52A and 33A wipe silicone rubber onto the first and second layers of wires to water block them. The cable then passes through an extruder 34 to extrude the outer jacket 26 over the wires.

We have found that a submarine cable as described has a low loss, e.g. better than 0.4 dB per Kilometer over a temperature range of 4° C. to 20° C., and at a wavelength of 1310 nm..

The construction limits the minimum bend radius to 0.6 metres and this enables the very low loss of the package of FIG. 2 to be maintained in the finished cable.

We have also devised a simple stripping and splicing method. We have discovered that for a material like Hytrel it is possible to heat the end of the element 20 and the buffer coatings appear to creep away from the coated fibres thus exposing them for subsequent splicing using conventional techniques. In particular the end portion of element 20 can be heated on a hot plate to about 200° C. and this effectively removes the buffer coatings prior to splicing.

We claim:

1. An optical fibre cable including a tubular tensile strength member defining a longitudinal chamber and, within said chamber, an optical fibre cable element comprising: a plurality of optical conductors each having over the bare conductor a first protective coating which is relatively thin; a central string wire having a buffer coating into which the fibres have been embedded with a zero angle of lay and so that they are spaced from the central string and from each other, and a second extruded buffer coating enveloping the embedded fibres, said cable having a longitudinal water blocking material in the gap between the element and the longitudinal chamber.

2. A method of making an optical fibre element in lengths in excess 3.5 km, comprising providing a string member comprising a buffer material, providing a plurality of optical fibres each having a protective coating thereon, drawing the string member and the fibres through a fixed lay plate and a tapered-aperture die spaced from the lay plate, in that order, the lay plate serving to maintain the fibres in a predetermined-spacedapart relationship as they enter the die, causing said fibres to become at least partially embedded in the buffer material, and extruding a buffer envelope over the central string member and embedded fibres to encapsulate the fibres in the buffer envelope and buffer material.

3. A method as claimed in claim 2, wherein said protective coating is an acrylate material.

4. A method as claimed in claim 2, wherein the protective coating comprises an inner layer of relatively soft material and an outer layer of a relatively hard material.

5. A method as claimed in claim 2 wherein the buffer coating comprises a thermoplastic elastomer, the method including the step of heating and softening the elastomer to facilitate embedding the fibres therein.

6. An optical fibre cable comprising a tubular tensile strength member defining a longitudinal chamber, and within said chamber, an optical fibre element made by a method as claimed in claim 2.

7. A method of making an optical fibre cable comprising providing or making an element as claimed in claim 6, inserting the element, into the open channel of elongate metal member, closing the metal member around the element with a small gap, said gap being water blocked with a water blocking medium, applying strength member wires around the closed metal member, and extruding a plastics jacket over the wires.

8. A method of making an optical fibre cable comprising providing or making an element as claimed in claim 1, respectively, inserting the element into the open channel of elongate metal member, closing the metal member around the element with a small gap, said gap being water blocked with a water blocking medium, applying strength member wires around the closed metal member, and extruding a plastics jacket over the wires.

* * * * *